(12) United States Patent
Reed et al.

(10) Patent No.: US 7,928,042 B2
(45) Date of Patent: Apr. 19, 2011

(54) COMPOSITION AND METHOD FOR RECOVERING HYDROCARBON FLUIDS FROM A SUBTERRANEAN RESERVOIR

(75) Inventors: Peter E. Reed, Plainfield, IL (US); Kin-Tai Chang, Sugar Land, TX (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 12/427,064

(22) Filed: Apr. 21, 2009

(65) Prior Publication Data

US 2010/0022419 A1    Jan. 28, 2010

Related U.S. Application Data

(60) Provisional application No. 61/046,726, filed on Apr. 21, 2008.

(51) Int. Cl.
    *C09K 8/60*      (2006.01)
    *E21B 33/13*      (2006.01)
    *E21B 43/16*      (2006.01)

(52) U.S. Cl. ............... 507/219; 166/295; 166/305.1; 507/224; 507/266

(58) Field of Classification Search ............. 507/219, 507/224, 266; 166/305.1, 295
See application file for complete search history.

(56) References Cited

U.S. PATENT DOCUMENTS

| | | | |
|---|---|---|---|
| 5,183,859 A * | 2/1993 | Sasaki et al. ............ 525/309 |
| 5,403,893 A | 4/1995 | Tanaka et al. | |
| 5,465,792 A | 11/1995 | Dawson et al. | |
| 5,580,929 A | 12/1996 | Tanaka et al. | |
| 5,735,349 A | 4/1998 | Dawson et al. | |
| 6,454,003 B1 | 9/2002 | Chang et al. | |
| 6,709,409 B2 | 3/2004 | Vella | |
| 6,984,705 B2 | 1/2006 | Chang et al. | |
| 7,300,973 B2 | 11/2007 | Chang et al. | |
| 2002/0001698 A1 * | 1/2002 | Blankenship et al. ...... 428/195 |
| 2007/0204989 A1 | 9/2007 | Tang | |

FOREIGN PATENT DOCUMENTS

| | | | |
|---|---|---|---|
| EP | 368244 A2 * | 5/1990 |
| GB | 2262117 A | 9/1993 |

OTHER PUBLICATIONS

International Search Report and Written Opinion for PCT/US2009/041213.

* cited by examiner

*Primary Examiner* — Timothy J. Kugel

(74) *Attorney, Agent, or Firm* — Michael M. Martin

(57) ABSTRACT

This invention is directed to a composition comprising expandable polymeric microparticles comprising an interpenetrating polymer network (IPN). The IPN constrains the microparticle to an unexpanded volume average particle size diameter of from about 0.05 to about 5,000 microns. Labile cross-links in the polymers of the IPN are subject to degradation, which results in release of the expandable microparticle so that the microparticle expands. The invention is further directed to the use of the composition for modifying the permeability of subterranean formations and increasing the mobilization and/or recovery rate of hydrocarbon fluids present in the formations.

20 Claims, 2 Drawing Sheets

COMPOSITION AND METHOD FOR RECOVERING HYDROCARBON FLUIDS FROM A SUBTERRANEAN RESERVOIR

CROSS-REFERENCE TO RELATED APPLICATIONS

This application claims benefit of U.S. Provisional Patent Application No. 61/046,726, filed Apr. 21, 2008.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

FIELD OF THE INVENTION

This invention relates to compositions and methods for the recovery of hydrocarbon fluids from a subterranean reservoir and more particularly to an expandable polymeric microparticle composition comprising an interpenetrating polymer network that modifies the permeability of subterranean formations, thereby increasing the mobilization and/or recovery rate of hydrocarbon fluids present in the formations.

BACKGROUND

In the first stage of hydrocarbon recovery an energy source present in a reservoir is allowed to move to a producing wells(s) where the hydrocarbon can flow or be pumped to a surface handling facility. Typically a relatively small proportion of reservoir hydrocarbon can be recovered by this means. To increase production, fluids are injected down adjacent wells to force an additional amount of hydrocarbon to the surface. This is commonly known as secondary recovery. The fluids normally used are water (such as aquifer water, river water, sea water, or produced water), or gas (such as produced gas, carbon dioxide, flue gas and various others). Additionally, if the fluid encourages movement of normally immobile residual oil or other hydrocarbons, such a process is termed tertiary recovery.

A prevalent problem with secondary and tertiary recovery projects relates to the heterogeneity of the reservoir rock strata. The mobility of the injected fluid typically is different from the hydrocarbon. For instance, when the fluid is more mobile various mobility control processes are required to make the sweep of the reservoir more uniform and the consequent hydrocarbon recovery more efficient. Unfortunately such processes have limited value when high permeability zones, commonly called thief zones or streaks, exist within the reservoir rock. The injected fluid follows a low resistance route from the injection well to the production well. In such cases the injected fluid does not effectively sweep the hydrocarbon from adjacent, lower permeability zones. Further, when the produced fluid is re-used this can lead to fluid cycling through the thief zone with little resulting benefit and at great cost in terms of fuel and maintenance of the pumping system.

Numerous physical and chemical methods have been used to divert injected fluids out of the thief zones and into or near production and injection wells. When the treatment is applied to a producing well it is usually termed a water (or gas etc.) shut-off treatment. When it is applied to an injection well it is termed a profile control or conformance control treatment.

In cases where the thief zone(s) are isolated from the lower permeability adjacent zones, mechanical seals or "plugs" can be set in the well to block the entrance of the injected fluid. If the fluid enters or leaves the formation from the bottom of the well, cement can also be used to fill the well bore to above the zone of ingress.

When the completion of the well allows the injected fluid to enter both the thief and the adjacent zones, a cement squeeze is often a suitable means of isolating the watered out zone. Certain cases, however, are not amenable to such methods because communication exists between layers of the reservoir rock outside the reach of cement. Typical examples of this are when fractures or rubble zones or washed out caverns exist behind the casing. In such instances chemical gels, capable of moving through pores in reservoir rock have been applied to seal the swept out zones.

When such methods fail the only remaining alternatives are to produce the well with poor recovery rate, sidetrack the well away from the prematurely swept zone, or abandon the well. Occasionally the producing well is converted to a fluid injector to increase the field injection rate above the net hydrocarbon extraction rate and increase the pressure in the reservoir. This can lead to improved overall recovery, but it is worth noting that the injected fluid will mostly enter the thief zone at the new injector and is likely to cause similar problems in nearby wells. Further, all of these methods are expensive.

Near wellbore conformance control methods always fail when the thief zone is in widespread contact with the adjacent, hydrocarbon containing, lower permeability zones. The reason for this is that the injected fluids can bypass the treatment and re-enter the thief zone having only contacted little or none of the remaining hydrocarbon. It is commonly known amongst those skilled in the art, that such near wellbore treatments do not succeed in significantly improving recovery in reservoirs having crossflow of the injected fluids between zones.

A few processes have been developed with the aim of reducing the permeability in a substantial proportion of the thief zone and, or at a significant distance from the injection and production wells. One example of this is the Deep Diverting Gel process patented by Morgan et al (1). This has been used in the field and suffered from sensitivity to unavoidable variations in quality of the reagents, which resulted in poor propagation. The gelant mixture is a two-component formulation and it is believed that this contributed to poor propagation of the treatment into the formation.

The use of swellable cross linked superabsorbent polymer microparticles for modifying the permeability of subterranean formations is disclosed in U.S. Pat. Nos. 5,465,792 and 5,735,349. However, swelling of the superabsorbent microparticles described therein is induced by changes of the carrier fluid from hydrocarbon to aqueous or from water of high salinity to water of low salinity.

Crosslinked, expandable polymeric microparticles and their use for modifying the permeability of subterranean formations and increasing the mobilization and/or recovery rate of hydrocarbon fluids present in the formation are disclosed in U.S. Pat. Nos. 6,454,003 B1, 6,709,402 B2, 6,984,705 B2 and 7,300,973 B2 and in published U.S. Patent Application No. 2007/0204989 A1.

Interpenetrating polymer networks capable of undergoing reversible, continuous, or discontinuous phase transitions in response to a change in a specific stimulus are disclosed in U.S. Pat. No. 5,580,929 and U.S. Pat. No. 5,403,893.

SUMMARY

We have discovered novel expandable polymeric microparticles comprising an interpenetrating polymer network (IPN) with different base polymers forming a base microparticle. In an embodiment, the IPN further comprises one or more labile polymers. The microparticle conformation and unexpanded size is constrained by the physical limits imposed by the labile polymers that have reversible internal crosslinks. The labile polymer in effect maintains the size of the particle for a period of time until an activating event removes or degrades the labile polymer and allows for overall expansion of the microparticle. The unexpanded microparticle properties, such as average particle size distribution and density, allow for efficient propagation through the pore structure of hydrocarbon reservoir matrix rock, such as sandstone. On exposing the microparticles for a period of time to activating conditions such as a change in temperature and/or at a predetermined pH, however, the reversible (labile) internal crosslinks in the labile polymers break allowing the underlying expandable microparticle to expand by absorbing the injection fluid (normally water).

The ability of the microparticle to expand from its original size (at the point of injection) depends on the presence of conditions that induce the breaking of the labile crosslinkers in the labile polymers networked with the polymers of the primary microparticle. The particles of this invention can propagate through the porous structure of the reservoir without necessarily using a designated fluid or fluid with salinity higher than the reservoir fluid.

The released, expanded primary polymeric microparticle is engineered to have a particle size distribution and physical characteristics, for example, particle rheology, that allow it to impede the flow of injected fluid in the pore structure. In doing so it is capable of diverting chase fluid into less thoroughly swept zones of the reservoir.

The rheology and expanded particle size of the particle can be designed to suit the reservoir target. For example, characteristics of a microparticle for use in a particular reservoir are influenced by selecting a particular backbone monomer or comonomer ratio in the interpenetrating polymer. Another way to influence the characteristics of the microparticle is the degree of reversible (labile) and irreversible crosslinking introduced during manufacture of the primary polymers in the underlying microparticle or during manufacture of the interpenetrating polymers.

Accordingly, this invention can be directed to an expandable polymeric microparticle composition comprising cross-linked expandable polymeric microparticles that comprise polymers that form an interpenetrating polymer network. In an embodiment the interpenetrating polymer network further comprises one or more labile polymers. The invention is further directed to a method of modifying the water permeability of a subterranean formation by injecting into the subterranean formation the composition comprising cross-linked expandable polymeric microparticles which comprise an interpenetrating polymer network.

DETAILED DESCRIPTION

Definitions of Terms

Figure 1:
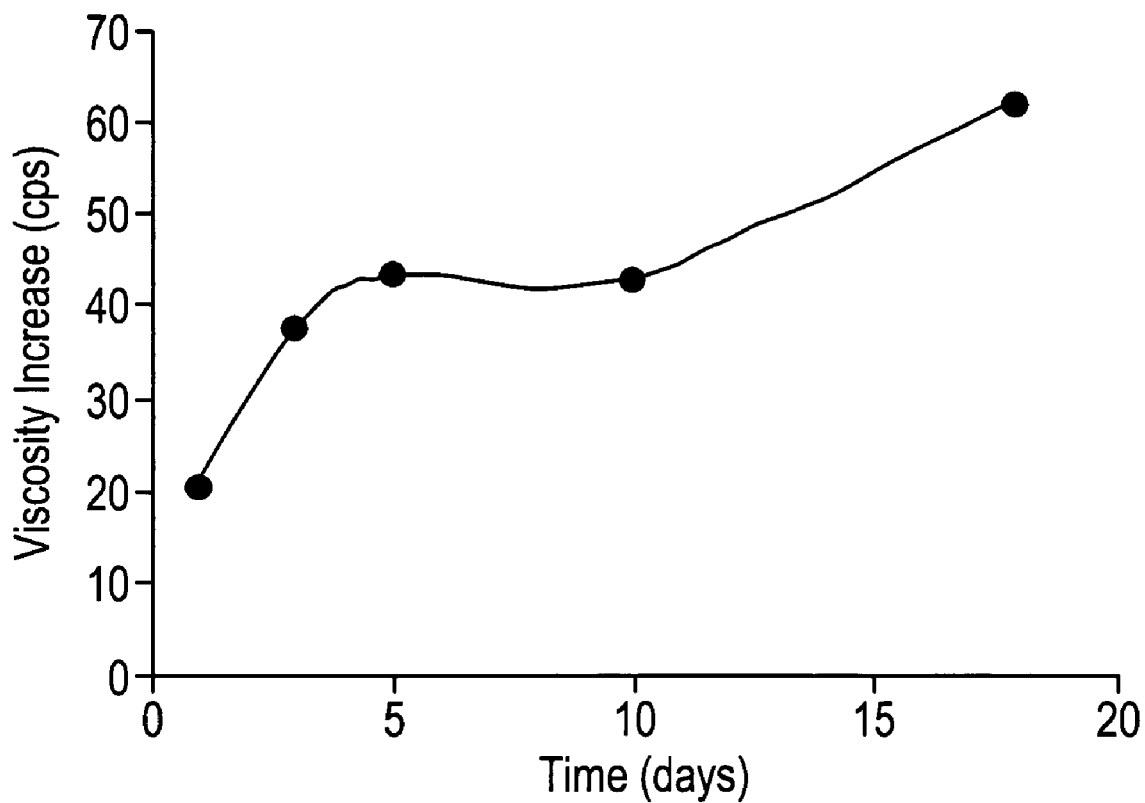
FIG. 1 is the hydrolysis profile obtained for an expandable polymeric microparticle comprising an interpenetrating polymer network prepared according to Example 11.

An interpenetrating polymer network (IPN) means a combination of two different polymers which are not connected to each other by covalent bonds, but which interact with each other instead by other means, owing to the close physical proximity of the two different polymers in the particles. These other means of interaction might include physical entanglements, ionic interactions, or hydrogen-bonding interactions, either alone or in combination. Physical entanglements refer to the looping or twisting of individual polymer chains from each different type of polymer around each other. Preferably, this is accomplished by forming the two polymers sequentially, by forming the second polymer in the presence of the first one.

"Amphoteric polymeric microparticle" means a cross-linked polymeric microparticle containing both cationic substituents and anionic substitutents, although not necessarily in the same stoichiometric proportions. Representative amphoteric polymeric microparticles include terpolymers of nonionic monomers, anionic monomers and cationic monomers as defined herein. Preferred amphoteric polymeric microparticles have a higher than 1:1 anionic monomer:cationic monomer mole ratio.

"Ampholytic ion pair monomer: means the acid-base salt of basic, nitrogen containing monomers such as dimethylaminoethylacrylate (DMAEA), dimethylaminoethyl methacrylate (DMAEM), 2-methacryloyloxyethyldiethylamine, and the like and acidic monomers such as acrylic acid and sulfonic acids such as 2-acrylamido-2-methylpropane sulfonic acid, 2-methacryloyloxyethane sulfonic acid, vinyl sulfonic acid, styrene sulfonic acid, and the like.

"Anionic monomer" means a monomer as defined herein which possesses an acidic functional group and the base addition salts thereof. Representative anionic monomers include acrylic acid, methacrylic acid, maleic acid, itaconic acid, 2-propenoic acid, 2-methyl-2-propenoic acid, 2-acrylamido-2-methyl propane sulfonic acid, sulfopropyl acrylic acid and other water-soluble forms of these or other polymerizable carboxylic or sulphonic acids, sulphomethylated acrylamide, allyl sulphonic acid, vinyl sulphonic acid, the quaternary salts of acrylic acid and methacrylic acid such as ammonium acrylate and ammonium methacrylate, and the like. Preferred anionic monomers include 2-acrylamido-2-methyl propanesulfonic acid sodium salt, vinyl sulfonic acid sodium salt and styrene sulfonic acid sodium salt. 2-Acrylamido-2-methyl propanesulfonic acid sodium salt is more preferred.

"Anionic polymeric microparticle" means a cross-linked polymeric microparticle containing a net negative charge. Representative anionic polymeric microparticles include copolymers of acrylamide and 2-acrylamido-2-methyl propane sulfonic acid, copolymers of acrylamide and sodium acrylate, terpolymers of acrylamide, 2-acrylamido-2-methyl propane sulfonic acid and sodium acrylate and homopolymers of 2-acrylamido-2-methyl propane sulfonic acid. Preferred anionic polymeric microparticles are prepared from about 95 to about 10 mole percent of nonionic monomers and from about 5 to about 90 mole percent anionic monomers. More preferred anionic polymeric microparticles are prepared from about 95 to about 10 mole percent acrylamide and from about 5 to about 90 mole percent 2-acrylamido-2-methyl propane sulfonic acid.

Betaine-containing polymeric microparticle" means a cross-linked polymeric microparticle prepared by polymerizing a betaine monomer and one or more nonionic monomers.

"Betaine monomer" means a monomer containing cationically and anionically charged functionality in equal proportions, such that the monomer is net neutral overall. Representative betaine monomers include N,N-dimethyl-N-acryloyloxyethyl-N-(3-sulfopropyl)-ammonium betaine, N,N-dimethyl-N-methacryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(2-carboxymethyl)-ammonium betaine, N,N-dimethyl-N-acryloxyethyl-N-(3-sulfopropyl)-ammonium betaine, N,N-dimethyl-N-acrylamidopropyl-N-(2-carboxymethyl)-ammonium betaine, N-3-sulfopropylvinylpyridine ammonium betaine, 2-(methylthio)ethyl methacryloyl-S-(sulfopropyl)-sulfonium betaine, 1-(3-sulfopropyl)-2-vinylpyridinium betaine, N-(4-sulfobutyl)-N-methyldiallylamine ammonium betaine (MDABS), N,N-diallyl-N-methyl-N-(2-sulfoethyl)ammonium betaine, and the like. A preferred betaine monomer is N,N-dimethyl-N-methacryloyloxyethyl-N-(3-sulfopropyl)-ammonium betaine.

"Cationic Monomer" means a monomer unit as defined herein which possesses a net positive charge. Representative cationic monomers include the quaternary or acid salts of dialkylaminoalkyl acrylates and methacrylates such as dimethylaminoethylacrylate methyl chloride quaternary salt (DMAEA.MCQ), dimethylaminoethylmethacrylate methyl chloride quaternary salt (DMAEM.MCQ), dimethylaminoethylacrylate hydrochloric acid salt, dimethylaminoethylacrylate sulfuric acid salt, dimethylaminoethyl acrylate benzyl chloride quaternary salt (DMAEA.BCQ) and dimethylaminoethylacrylate methyl sulfate quaternary salt; the quaternary or acid salts of dialkylaminoalkylacrylamides and methacrylamides such as dimethylaminopropyl acrylamide hydrochloric acid salt, dimethylaminopropyl acrylamide sulfuric acid salt, dimethylaminopropyl methacrylamide hydrochloric acid salt and dimethylaminopropyl methacrylamide sulfuric acid salt, methacrylamidopropyl trimethyl ammonium chloride and acrylamidopropyl trimethyl ammonium chloride; and N,N-diallyldialkyl ammonium halides such as diallyldimethyl ammonium chloride (DADMAC). Preferred cationic monomers include dimethylaminoethylacrylate methyl chloride quaternary salt, dimethylaminoethylmethacrylate methyl chloride quaternary salt and diallyldimethyl ammonium chloride. Diallyldimethyl ammonium chloride is more preferred.

"Cross linking monomer" means an ethylenically unsaturated monomer containing at least two sites of ethylenic unsaturation, which is added to constrain the microparticle conformation of the polymeric microparticles of this invention. The level of any cross linking agents used in these polymer microparticles is selected to maintain a rigid non-expandable microparticle configuration. Cross linking monomers according to this invention include both labile cross linking monomers and non-labile cross linking monomers.

"Emulsion", "microemulsion" and "inverse emulsion" mean a water-in-oil polymer emulsion comprising a polymeric microparticle according to this invention in the aqueous phase, a hydrocarbon oil for the oil phase and one or more water-in-oil emulsifying agents. Emulsion polymers are hydrocarbon continuous with the water-soluble polymers dispersed within the hydrocarbon matrix. The emulsion polymer are optionally "inverted" or converted into water-continuous form using shear, dilution, and, generally an inverting surfactant. See U.S. Pat. No. 3,734,873, incorporated herein by reference.

"Fluid mobility" means a ratio that defines how readily a fluid moves through a porous medium. This ratio is known as the mobility and is expressed as the ratio of the permeability of the porous medium to the viscosity for a given fluid.

1. EQUATION 1 for a single fluid x flowing in a porous medium.

$$\lambda = \frac{k_x}{\eta_x}$$

When more than one fluid is flowing the end point relative permeabilities must be substituted for the absolute permeability used in equation 1.

2. EQUATION 2 for a fluid x flowing in a porous medium in the presence of one or more other fluids.

$$\lambda_x = \frac{k_{rx}}{\eta_x}$$

When two or more fluids are flowing the fluid mobilities may be used to define a Mobility ratio:

3. EQUATION 3

$$M = \frac{\lambda_x}{\lambda_y} = \frac{\eta_y k_{rx}}{\eta_x k_{ry}}\Bigg|$$

The mobility ratio is of use in the study of fluid displacement, for example in water flooding of an oil reservoir where x is water and y is oil, because the efficiency of the displacement process can be related to it. As a general principle at a mobility ratio of 1 the fluid front moves almost in a "Plug flow" manner and the sweep of the reservoir is good. When the mobility of the water is ten times greater than the oil viscous instabilities, known as fingering, develop and the sweep of the reservoir is poor. When the mobility of the oil is ten times greater than the water the sweep of the reservoir is almost total.

"Ion-pair polymeric microparticle" means a cross-linked polymeric microparticle prepared by polymerizing an ampholytic ion pair monomer and one more anionic or nonionic monomers.

"Labile cross linking monomer" means a cross linking monomer which can be degraded by certain conditions of heat, pH or a combination thereof, after it has been incorporated into the polymer structure, to reduce the degree of crosslinking in the polymeric microparticle. The aforementioned conditions are such that they can cleave bonds in the "cross linking monomer" without substantially degrading the rest of the polymer backbone. Representative labile cross linking monomers include diacrylamides and methacrylamides of diamines such as the diacrylamide of piperazine, acrylate or methacrylate esters of di, tri, tetra hydroxy compounds including ethyleneglycol diacrylate, polyethyleneglycol diacrylate, trimethylopropane trimethacrylate, ethoxylated trimethylol triacrylate, ethoxylated pentaerythritol tetracrylate, and the like; divinyl or diallyl compounds separated by an azo such as the diallylamide of 2,2'-Azobis(isbutyric acid) and the vinyl or allyl esters of di or tri functional acids. Preferred labile cross linking monomers include water soluble diacrylates such as PEG 200 diacrylate and PEG 400 diacrylate and polyfunctional vinyl derivatives of a polyalcohol such as ethoxylated (9-20) trimethylol triacrylate. The labile cross linker may be present in an amount of from about 100 to about 200,000 ppm. In alternative aspects, the labile cross linker is present in the amount of about 1,000 to about 200,000 ppm, about 9,000 to about 200,000 ppm, about 9,000 to about 100,000 ppm, about 20,000 to about 60,000, about 1,000 to about 20,000 ppm or about 500 to about 50,000 ppm based on total moles of monomer.

"Labile polymers" means any cross-linked polymers wherein at least a portion of the cross-links are reversible (labile).

"Monomer" means a polymerizable allylic, vinylic or acrylic compound. The monomer may be anionic, cationic, nonionic or zwitterionic. Vinyl monomers are preferred, acrylic monomers are more preferred.

"Nonionic monomer" means a monomer as defined herein which is electrically neutral. Representative nonionic monomers include N-isopropylacrylamide, N,N-dimethylacrylamide, N,N-diethylacrylamide, dimethylaminopropyl acrylamide, dimethylaminopropyl methacrylamide, acryloyl morpholine, hydroxyethyl acrylate, hydroxypropyl acrylate, hydroxyethyl methacrylate, hydroxypropyl methacrylate, dimethylaminoethylacrylate (DMAEA), dimethylaminoethyl methacrylate (DMAEM), maleic anhydride, N-vinyl pyrrolidone, vinyl acetate and N-vinyl formamide. Preferred nonionic monomers include acrylamide, N-methylacrylamide, N,N-dimethylacrylamide and methacrylamide. Acrylamide is more preferred.

"Non-labile cross linking monomer" means a cross linking monomer which is not degraded under the conditions of temperature and/or pH which would cause incorporated labile cross linking monomer to disintegrate. Non-labile cross linking monomer is added, in addition to the labile cross linking monomer, to control the expanded conformation of the polymeric microparticle. Representative non-labile cross linking monomers include methylene bisacrylamide, diallylamine, triallylamine, divinyl sulfone, diethyleneglycol diallyl ether, and the like. A preferred non-labile cross linking monomer is methylene bisacrylamide.

In one aspect, the polymers forming the constrained base expandable microparticle are cross-linked expandable polymers with labile and non-labile cross-linkers such as, but not limited to, those described in U.S. Pat. Nos. 6,454,003 B1, 6,709,402 B2, 6,984,705 B2 and 7,300,973 B2 and in published U.S. Patent Application No. 2007/0204989 A1. For example, in one aspect the non-labile cross linker is present in the expandable microparticles in an amount of from 0 to about 300 ppm, in another aspect from about 2 to about 300 ppm, in another aspect from about 0 to about 200 ppm, in another aspect from about 0 to about 100 ppm, in another aspect from about 01 to about 300 ppm, in another aspect from about 2 to about 300 ppm and in another aspect from about 5 to about 300 ppm based on total moles of monomer. In the absence of a non-labile cross linker, the polymer particle, upon complete scission of labile cross linker, is converted into a mixture of linear polymer strands. The particle dispersion is thereby changed into a polymer solution. This polymer solution, due to its viscosity, changes the mobility of the fluid in a porous medium. In the presence of a small amount of non-labile cross linker, the conversion from particles to linear molecules is incomplete. The particles become a loosely linked network but retain certain 'structure'. Such 'structured' particles can block the pore throats of porous media and create a blockage of flow.

In another aspect, the polymers forming the underlying expandable polymeric microparticles are any expandable polymers, such as but not limited to cross-linked polymers with non-labile cross-links, that are capable of forming unexpanded polymeric particles of a size of about 0.05 to about 5,000 microns. Suitable expandable polymers include for example polyvinyl pyrrolidone, poly(hydroxyethyl)methacrylate, and polymers with polyacrylate backbones and non-labile monomer cross-links such as methylene bisacrylamide.

In one aspect of the present invention, a composition including the expandable polymeric microparticles comprising an interpenetrating polymer network form a microparticle that may be used advantageously in recovery of hydrocarbon from a subterranean formation. In an embodiment, the interpenetrating polymer network further comprises one or more labile polymers. The labile polymers are any labile polymers that form an IPN with the main polymers in the expandable polymeric microparticles and which interact with the polymeric microparticles through non-covalent interaction. For example, ionic bonds, physical entanglements, or hydrogen bonds, or other bonds that break upon exposure to activating conditions or agents such as water or heat are used. Physical entanglements refer to looping or twisting around each other of the individual polymer chains in the labile polymer and in the expandable primary microparticle.

In one aspect, suitable physical entanglement is achieved by forming the two types of polymers sequentially where one is formed in the presence of the other, for example by forming (conducting the polymerizing reaction) the labile polymers in the presence of previously formed cross-linked expandable microparticles. Alternatively, the cross-linked expandable microparticles are formed in the presence of the previously synthesized labile polymers. A relatively strong IPN of the two types of polymer is formed when created this way. However, suitable IPN's are formed from physical entanglements resulting from simple combination of the two groups of polymers after they have each been synthesized. Another type of non-covalent interaction that suitably stabilizes the IPN is an ionic interaction. Ionic interactions will form between two charged polymers (i.e. polymers bearing charged groups) if the polymers have opposing charges. The opposing charges attract each other form labile ionic bonds between constituent polymer chains in each of the two types of polymer (the polymers in the underlying expandable microparticle and the labile polymers). Alternatively, ionic interactions between two different like-charged polymers can be induced using a multivalent ion intermediate with an opposing charge to the charge of the polymers, and which binds simultaneously to both polymers. In an exemplary embodiment, the labile polymers are made using labile cross-links that degrade upon exposure to an activating event or condition such as a change in temperature, pH, salinity or the like. In one aspect, the cross-linkers degrade at the higher temperatures encountered in the subterranean formation. Once the cross-linkers of the labile polymers degrade, the IPN degrades and allows the underlying expandable microparticle to expand or swell. Examples of suitable cross-linkers for the labile polymers include, but are not limited to, diester and other types of labile cross-linkers such as polyethyleneglycol diacrylate (e.g. PEG-200 diacrylate) as described in detail in U.S. Pat. No. 6,454,003. In addition, cationic ester monomers can be used as ionic cross-linkers for the labile polymers, because they form ionic bonds with any anionic polymers forming the underlying unexpanded polymeric microparticle. In the higher temperatures encountered in the formation, the cationic ester mer units will hydrolyze, eventually converting the initially cationic labile polymers to an anionic polymer that is no longer capable of forming an ionic interaction with the anionic polymers forming the underlying unexpanded polymeric microparticle. Examples of suitable cationic ester monomers for making labile polymers include, but are not limited to N,N-dimethylaminoethyl acyrylate and N,N-dimethylaminoethyl methacrylate.

In an embodiment, the labile polymers comprise about 1 to about 75 weight percent of the total polymer content. In another embodiment, the labile polymers comprise about 1 to about 25 weight percent of the total polymer content of the microparticles.

The labile polymers may be formed using labile cross-links that can be selected for susceptibility to degradation upon exposure to any one of a number of activating events. Temperature and pH changes are exemplary activating events, but other activating events for sufficient degradation of labile cross-links in the labile polymers are contemplated, including a change in pressure, salinity, shear, or dilution. The activating event may be for example exposure to an activating agent such as exposure to an oxidant, a reductant, an acid, a base, a biological agent, an organic or inorganic cross-linking agent, or a salt, or to a combination thereof. Upon exposure to the activating event and consequent degradation of the labile polymers forming the IPN with polymers in the underlying microparticles, the cross-linked expandable polymeric microparticles are free to expand to several times the original size of the microparticle while yet constrained by the IPN.

Examples of labile polymers that may be used include for example the labile polymers described in U.S. Pat. No. 6,616,946, including temperature responsive polymers (such as NIPAAm), pH responsive polymers, ion responsive polymers and polymers with multi-stimulus sensitivity. pH sensitive polymers include those based on pH sensitive vinyl monomers, such as acrylic acid (AAc), methacrylic acid (MAAc), maleic anhydride (MAnh), maleic acid (MAc), 2-acrylamido-2-Methyl-1-Propanesulfonic Acid (AMPS), N-vinyl formamide (NVA), N-vinyl acetamide (NVA), aminoethyl methacrylate (AEMA), phosphoryl ethyl acrylate (PEA), or methacrylate (PEMA). pH sensitive polymers may also be synthesized as polypeptides from amino acids (e.g. polylysine or polyglutamic acid) or derived from naturally occurring polymers such as proteins (e.g. lysozyme, albumin, casein, etc.), or polysaccharides (e.g. alginic acid, hyaluronic acid, carrageenan, chitosan, carboxymethyl cellulose, etc.) or nucleic acids, such as DNA. Specific examples of pH-sensitive polymers include: copolymer of derivatized 4-amino-N-[4,6-dimethyl-2-pyrimidinyl]benzene sulfonamide and N,N-dimethylacrylamide, poly(hydroxethyl)methacrylate-co-methacrylic acid), and copolymer of M,N, dimethylaminoethyl methacrylate and divinyl benzene. Ion responsive polymers include polysaccharides such as carrageenan that change their conformation, for example, from a random to an ordered conformation, as a function of exposure to a specific ions, or polymers such as those with pendant ion chelating groups, such as histidine or EDTA, for example. Dual or multi stimuli responsive polymers may also be used.

PREFERRED EMBODIMENTS

In one aspect, the base polymeric microparticles are composed of cross-linked expandable polymeric microparticles that are prepared using an inverse emulsion or microemulsion process to assure certain particle size range. In an embodiment, the unexpanded volume average particle size diameter of the polymeric microparticle is about 0.05 to about 5,000 microns. In another embodiment the particle size is about 0.05 to about 50 microns. In another embodiment the particle size is about 0.1 to about 3 microns. In another embodiment, the particle size is about 0.1 to about 1 microns, including the labile polymers forming the IPN with the polymers of the expandable microparticles.

Representative preparations of cross-linked expandable polymeric microparticles using a microemulsion process are described in U.S. Pat. Nos. 4,956,400, 4,968,435, 5,171,808, 5,465,792 and 5,737,349.

In an inverse emulsion or microemulsion process, an aqueous solution of monomers and cross linkers is added to a hydrocarbon liquid containing an appropriate surfactant or surfactant mixture to form an inverse monomer microemulsion consisting of small aqueous droplets dispersed in the continuous hydrocarbon liquid phase and subjecting the monomer microemulsion to free radical polymerization.

In addition to the monomers and cross linkers, the aqueous solution may also contain other conventional additives including chelating agents to remove polymerization inhibitors, pH adjusters, initiators and other conventional additives.

The hydrocarbon liquid phase comprises a hydrocarbon liquid or mixture of hydrocarbon liquids. Saturated hydrocarbons or mixtures thereof are preferred. Typically, the hydrocarbon liquid phase comprises benzene, toluene, fuel oil, kerosene, odorless mineral spirits and mixtures of any of the foregoing.

Surfactants useful in the microemulsion polymerization process described herein include sorbitan esters of fatty acids, ethoxylated sorbitan esters of fatty acids, and the like or mixtures thereof. Preferred emulsifying agents include ethoxylated sorbitol oleate and sorbitan sesquioleate. Additional details on these agents may be found in McCutcheon's Detergents and Emulsifiers, North American Edition, 1980.

Polymerization of the emulsion may be carried out in any manner known to those skilled in the art. Initiation may be effected with a variety of thermal and redox free-radical initiators including azo compounds, such as azobisisobutyronitrile; peroxides, such as t-butyl peroxide; organic compounds, such as potassium persulfate and redox couples, such as sodium bisulfite/sodium bromate. Preparation of an aqueous product from the emulsion may be effected by inversion by adding it to water, which may contain an inverting surfactant. The IPN may then be formed by effecting polymerization of the labile polymers in the presence of the previously formed microparticles.

Alternatively, the polymeric microparticles cross linked with labile cross links are prepared by internally cross linking polymer particles which contain polymers with pendant carboxylic acid and hydroxyl groups. The cross linking is achieved through the ester formation between the carboxylic acid and hydroxyl groups. The esterification can be accomplished by azeotropic distillation (U.S. Pat. No. 4,599,379) or thin film evaporation technique (U.S. Pat. No. 5,589,525) for water removal. For example, a polymer microparticle prepared from inverse emulsion polymerization process using acrylic acid, 2-hydroxyethylacrylate, acrylamide and 2-acrylamido-2-methylpropanesulfonate sodium as monomer is converted into cross linked polymer particles by the dehydration processes described above.

The polymeric microparticles are optionally prepared in dry form by adding the emulsion to a solvent which precipitates the polymer such as isopropanol, isopropanol/acetone or methanol/acetone or other solvents or solvent mixtures that are miscible with both hydrocarbon and water and filtering off and drying the resulting solid.

An aqueous suspension of the polymeric microparticles is prepared by redispersing the dry polymer in water.

In another embodiment, this invention is directed to a method of modifying the permeability to water of a subterranean formation by injecting into the subterranean formation a composition comprising an interpenetrating polymer network. In an embodiment, the interpenetrating polymer network further comprises one or more labile polymers. The microparticles comprising the IPN have an unexpanded volume average particle size diameter of from about 0.05 to about 5,000 microns and have a smaller diameter than the pores of the subterranean formation, and degrade under a change in environmental conditions in the subterranean formation so that the expandable polymeric microparticles are free to expand. The composition then flows through a zone or zones of relatively high permeability in the subterranean formation under increasing temperature conditions, until the composition reaches a location where the temperature or pH is sufficiently high, for example, to promote degradation of the labile cross-links in the labile polymers and induce expansion of the microparticles by absorption of carrier fluid, typically water.

In an embodiment, about 100 ppm to about 100,000 ppm of the composition, based on polymer actives, is added to the subterranean formation. In another embodiment, about 500 ppm to about 10,000 ppm of the composition is added to the subterranean formation. In another embodiment, about 500 ppm to about 1000 ppm is added to the subterranean formation. The subterranean formation is for example a sandstone or carbonate hydrocarbon reservoir. In one embodiment, the composition is added to injection water as part of a secondary or tertiary process for the recovery of hydrocarbon from the subterranean formation. The injection water is added to the subterranean formation, for example a producing well, at a temperature lower than the temperature of the subterranean formation. The higher temperature within the formation causes the labile polymers of the IPN to degrade. In another aspect, the method may further involve introducing a change in the environmental conditions of the composition, wherein the change causes the labile polymers to degrade. The change in environmental conditions may be a change in pressure, salinity, shear force, or in dilution of the composition.

Unlike conventional blocking agents such as polymer solutions and polymer gels that cannot penetrate far and deep into the formation, the composition of this invention, due to the size of the particles and low viscosity, can propagate far from the injection point until it is activated to expand by spending enough time in the high temperature zone.

Also, the exemplary polymeric microparticles of this invention are highly crosslinked and do not expand in solutions of different salinity unless labile cross-linkers with sensitivity to salinity changes have been selected for the labile polymers. Consequently, the viscosity of the dispersion is typically not affected by the salinity of the fluid encountered in the subterranean formation. Accordingly, no special carrier fluid is needed for treatment. Only after the particles encounter conditions sufficient to reduce the crosslinking density in the labile polymers, is the fluid rheology changed to achieve the desired effect.

Among other factors, the reduction in crosslinking density is dependent on the rate of cleavage of the labile crosslinker. In particular, different labile crosslinkers, have different rates of bond cleavage at different temperatures. The temperature and mechanism depend on the nature of the cross-linking chemical bonds. For example, when the labile crosslinker is PEG diacrylate, hydrolysis of the ester linkage is the mechanism of de-crosslinking. Different alcohols have slightly different rates of hydrolysis. In general, methacrylate esters will hydrolyze at a slower rate than acrylate esters under similar conditions. With divinyl or diallyl compounds separated by an azo group such as the diallylamide of 2,2'-Azobis(isbutyric acid), the mechanism of de-crosslinking is elimination of a nitrogen molecule. As demonstrated by various azo initiators for free radical polymerization, different azo compounds indeed have different half-life temperatures for decomposition.

In addition to the rate of de-crosslinking in the labile polymers, the rate of particle diameter expansion may also depend on the total amount of remaining crosslinking. We have observed that expandable cross-linked particles initially expand gradually as the amount of crosslinking first begins decreases. After the total amount of crosslinking passes below a certain critical density, the viscosity increases explosively. Thus, by proper selection of the labile cross-linker in the labile polymers, both temperature- and time-dependent expansion properties can be incorporated into the expandable polymer particles involving an IPN.

The particle size of the polymer particles before expansion is selected based on the calculated pore size of the highest permeability thief zone. The crosslinker type and concentration, and hence the time delay before the injected particles begin to expand, is based on the temperature both near the injection well and deeper into the formation, the expected rate of movement of injected particles through the thief zone and the ease with which water can crossflow out of the thief zone into the adjacent, lower permeability, hydrocarbon containing zones. A polymer microparticle composition designed to incorporate the above considerations results in a better water block after particle expansion, and in a more optimum position in the formation.

The foregoing may be better understood by reference to the following examples, which are presented for purposes of illustration and are not intended to limit the scope of this invention.

EXAMPLES

Examples 1-8

Preparation of Expandable Polymeric Microparticles

Exemplary expandable cross-linked polymeric microparticles for making the IPN microparticles of this invention are readily prepared using inverse emulsion polymerization techniques as described below.

A representative emulsion polymer composition is prepared by polymerizing a monomer emulsion consisting of an aqueous mixture of 164.9 g of 50% acrylamide, 375.1 g of 58% sodium acrylamido methylpropane sulfonate (AMPS), 16.38 g water, 0.5 g 40% pentasodium diethylenetriaminepentaacetate, 3.2 g of 1% solution of methylenebisacrylamide (mba), and 36.24 g polyethyleneglycol (PEG) diacrylate as the dispersed phase and a mixture of 336 g petroleum distillate, 60 g ethoxylated sorbitol oleate and 4 g sorbitan sesquioleate as the continuous phase.

The monomer emulsion is prepared by mixing the aqueous phase and the oil phase, followed by homogenization using a Silverson Homogenizer. After deoxygenation with nitrogen for 30 minutes, polymerization is initiated by using sodium bisulfite/sodium bromate redox pair at room temperature. The temperature of the polymerization is not regulated. In general, the heat of polymerization will take the temperature from about 25° C. to about 80° C. in less than 5 minutes. After the temperature peaks, the reaction mixture is heated at about 75° C. for an additional 2 hours.

If desired, the polymeric microparticle can be isolated from the latex by precipitating, filtering, and washing with a mixture of acetone and isopropanol. After drying, the oil and surfactant free particle can be redispersed in aqueous media. The average particle size of this latex particle measured in deionized water, using a Malvern Instruments' Mastersizer E, is 0.28 micron.

Table 1 lists representative emulsion polymers prepared according to the method of Example 1.

TABLE 1

Preparation of polymeric microparticles in emulsion form

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| 50% acrylamide | 164.9 | 164.9 | 82.45 | 131.84 | 82.5 | 82.5 | 82.5 | 82.5 |
| 58% Na AMPS | 375.1 | 375.1 | 187.5 | 300 | 187.5 | 187.5 | 187.5 | 187.5 |
| DI water | 19.58 | 19.58 | 12.5 | 36.8 | 18 | 22.9 | 25.3 | 26.5 |
| Methylene bisacrylamide | 0.032 | 0.032 | 0 | 7.36 | 0 | 0 | 0 | 0 |
| PEG-200 diacrylate | 36.24 | 18.12 | 30.46[+1] | 0 | 9.75 | 4.87 | 2.44 | 1.22 |
| Crosslinker/monomer Molar ratio (ppm) | 56890 | 28500 | 28390 | 2839 | 18390 | 9080 | 4540 | 2270 |
| Petroleum distillate | 336 | 336 | 168 | 268.8 | 168 | 168 | 168 | 168 |
| Ethoxylated sorbitol oleate | 60 | 60 | 30 | 48 | 30 | 30 | 30 | 30 |
| Sorbitan sesquioleate | 4 | 4 | 2 | 3.2 | 2 | 2 | 2 | 2 |

[+1]PEG-400 diacrylate

Example 9

Preparation of Cationic Labile Polymers Forming an IPN with Expandable Polymeric Microparticles Polymeric microparticles as described in examples 1-8 are provided in aqueous solution. Starting with an aqueous suspension of any one of the polymeric microparticles as described in examples 1-8, an aqueous solution of N,N-dimethylaminoethyl acyrylate methyl chloride quat and acrylamide is further introduced to suspension. The cationic ester and acrylamide monomers diffuse into interior aspects of the microparticles in close physical proximity to the polymer chains of the polymers constituting the microparticles. Azobisisobutyronitrile is then added to the mixture as a free radical initiator, and the monomers are polymerized to form the labile polymer component of the IPN.

If desired, the polymeric microparticle can be isolated from the latex by precipitating, filtering, and washing with a mixture of acetone and isopropanol. After drying, the oil and surfactant free particle can be redispersed in aqueous media.

Example 10

Preparation of Crosslinked Labile Polymers Forming an IPN with Expandable Polymeric Microparticles Polymeric microparticles as described in examples 1-8 are provided in aqueous solution. Starting with an aqueous suspension of any one of the polymeric microparticles as described in examples 1-8, additional 50% acrylamide, 58% Na AMPS, and PEG-200 diacrylate is further introduced to suspension. Azobisisobutyronitrile is then added to the mixture as a free radical initiator, and the monomers are polymerized to form the labile polymer component of the IPN.

If desired, the polymeric microparticle can be isolated from the latex by precipitating, filtering, and washing with a mixture of acetone and isopropanol. After drying, the oil and surfactant free particle can be redispersed in aqueous media.

Example 11

A representative emulsion polymer composition is prepared by polymerizing a monomer emulsion consisting of an aqueous mixture of 61.35 g of 50% acrylamide, 18.76 g of 58% sodium acrylamido methylpropane sulfonate (AMPS), 2.48 g water, 0.03 g EDTA and 0.075 g 1% methylene bisacrylamide as the dispersed phase and a mixture of 101.3 g petroleum distillate, 24.0 g ethoxylated sorbitol oleate and 6.05 g sorbitan sesquioleate as the continuous phase. The monomer emulsion is prepared by mixing aqueous phase and oil phase. After deoxygenation with nitrogen for 30 minutes, polymerization is initiated with sodium bisulfite/sodium bromate redox pair at room temperature. The temperature of the polymerization is not regulated. After the polymerization temperature peaked waited another 30 minutes then added the $2^{nd}$ half of the monomer and mixed and purged with $N_2$ for next one hour at room temperature. The $2^{nd}$ half of the monomer is made up similar to the first half except the methylene bisacrylamide is replaced with 0.60 g polyethyleneglycol (PEG) diacrylate. After an hour of mixing and purging the polymerization is initiated with sodium bisulfite/sodium bromate redox pair at room temperature. After temperature peaked, reaction mixture is kept at 50° C. for an additional 2 hours.

Example 12

A representative emulsion polymer composition is prepared by polymerizing a monomer emulsion consisting of an aqueous mixture of 98.16 g of 50% acrylamide, 30.02 g of 58% sodium acrylamido methylpropane sulfonate (AMPS), 3.96 g water, 0.048 g EDTA and 0.12 g 1% methylene bisacrylamide as the dispersed phase and a mixture of 101.3 g petroleum distillate, 24.0 g ethoxylated sorbitol oleate and 6.05 g sorbitan sesquioleate as the continuous phase. The monomer emulsion is prepared by mixing aqueous phase and oil phase. After deoxygenation with nitrogen for 30 minutes, polymerization is initiated with sodium bisulfite/sodium bromate redox pair at room temperature. The temperature of the polymerization is not regulated. After the polymerization temperature peaked waited another 30 minutes then added the $2^{nd}$ part of the monomer and mixed and purged with $N_2$ for next one hour at room temperature. The $2^{nd}$ part of the monomer is made from an aqueous mixture of 24.54 g of 50% acrylamide, 7.50 g of 58% sodium acrylamido methylpropane sulfonate (AMPS), 0.99 g water, 0.012 g EDTA and 0.344 g polyethyleneglycol (PEG) diacrylate mixed as a solution. Polymerization is initiated with sodium bisulfite/sodium bromate redox pair at room temperature. After temperature peaked, reaction mixture is kept at 50° C. for an additional 2 hours.

Example 13

Activation of the Polymeric Microparticle by Heat

As the particles expand in a medium of fixed volume, the volume fraction occupied by the particles increases. Consequently, the volume fraction of the continuous phase decreases. The decrease in free volume is reflected in an increase in the viscosity of the dispersion. Heat activation of the microparticles of this invention is demonstrated in a bottle test.

To carry out a bottle test, a dispersion containing 5000 ppm of the particles is prepared in an aqueous medium (e.g. a synthetic brine). Dispersing of particles is accomplished by vigorous stirring or by using a homogenizer. To prevent oxidative degradation of the expanding particles during monitoring, 1000 ppm sodium thiosulfate is added to the mixture as an oxygen scavenger.

The bottles are placed in a constant temperature oven to age. Then, at a predetermined time, a bottle is removed from the oven and cooled to 75° F. The viscosity is measured at 75° F. using Brookfield LV No. 1 spindle at 60 rpm (shear rate 13.2 sec$^{-1}$).

Heat activation of the polymeric microparticles by heat is characterized by monitoring the viscosity change of aqueous dispersions of particles aged for increasing periods of time and at different temperatures.

Figure 2:
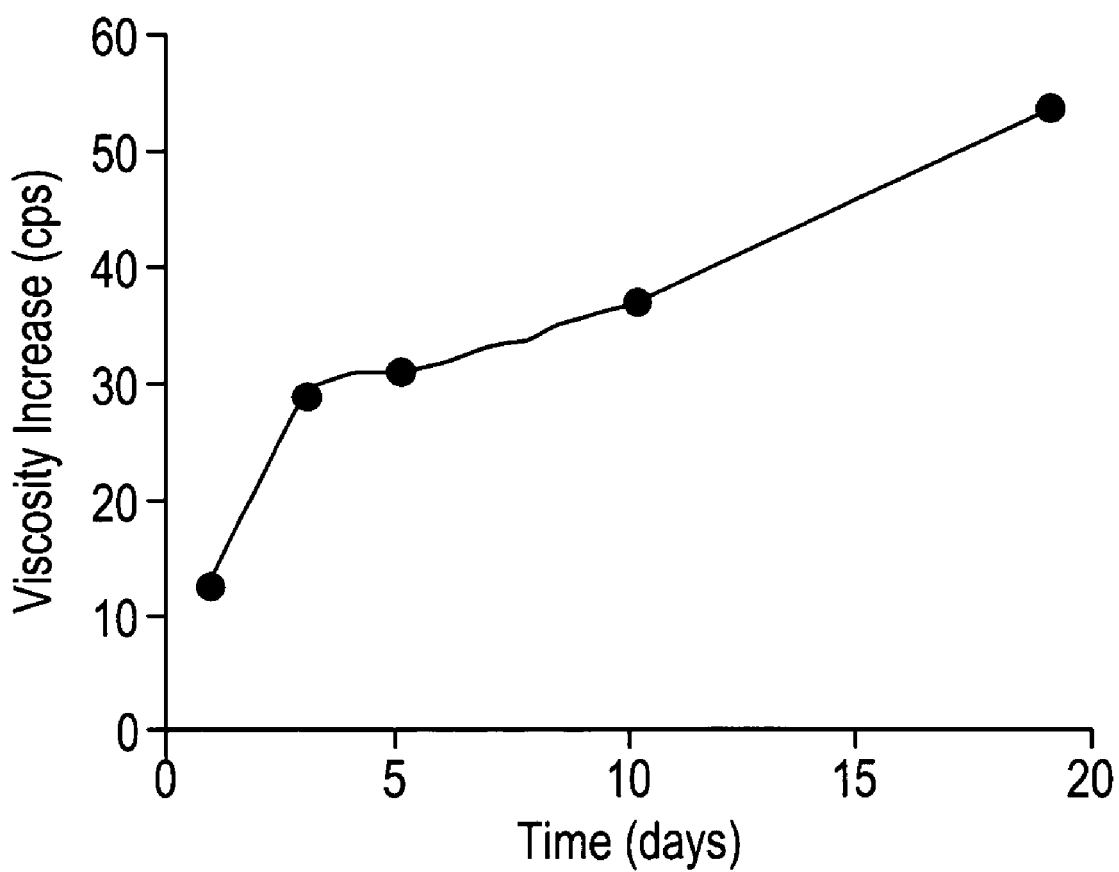
FIG. 2 is the hydrolysis profile obtained for an expandable polymeric microparticle comprising an interpenetrating polymer network prepared according to Example 12.

FIG. 1 and FIG. 2 show the hydrolysis profiles obtained from examples 11 and 12, respectively. The type of IPN networks is different between these samples. Example 11 shows an inter penetrating network made with 50% non-labile and 50% labile crosslinkers where as example 2 shows 80% of the network with non-labile and 20% with labile crosslinkers. Hydrolysis of these samples are conducted at 70° C. in synthetic sea brine solution, both samples show viscosity increase from expansion of the particles due to hydrolysis.

Example 14

Sand Pack Test

This Example demonstrates that the polymeric microparticle of this invention can be propagated with a conformation constrained in part by the IPN and will expand in size when this degrades, to give a particle of suitable size to produce a substantial effect.

In the sand pack test, a 40 foot long sand pack of 0.25 inches internal diameter, made from degreased and cleaned 316 stainless steel tubing, is constructed in eight sections, fitted with pressure transducers, flushed with carbon dioxide gas and then placed in an oven and flooded with synthetic oil field injection water.

A dispersion of a representative polymeric microparticle is prepared in the synthetic injection water and injected into the pack to fill the pore volume. Pressure drops across the tube sections are monitored for signs of conformation change of the polymer particle as labile elements in the microparticle composition are hydrolyzed. The "popping open" of the polymer particles is observed as a steep rise in the pressure drop. The sand pack test is described in detail in WO 01/96707.

The data for representative polymeric microparticles shows that the particles are able to travel through the first two sections of the sand pack without changing the RRF of the sections. However, particles in the last section, after accumulating a sufficient amount of residence time, have expanded and give a higher value of RRF. The higher RRF value is maintained after the injection fluid is changed from polymer dispersion to brine.

This example demonstrates that the polymeric microparticle composition with the microparticle conformation constrained by built-in labile elements can be propagated through a porous media. The microparticle will expand in size when labile elements such as crosslinks degrade, to give a particle of suitable size to produce a substantial effect, even in a high permeability porous medium.

It is to be understood that the specific embodiments of the present teachings as set forth herein are not intended as being exhaustive or limiting, and that many alternatives, modifications, and variations will be apparent to those of ordinary skill in the art in light of the foregoing examples and detailed description. Accordingly, the present teachings are intended to embrace all such alternatives, modifications, and variations that fall within the spirit and scope of the following claims.

All publications, patents, patent applications and other references cited in this application are herein incorporated by reference in their entirety as if each individual publication, patent, patent application or other reference are specifically and individually indicated to be incorporated by reference.

The invention claimed is:

1. An expandable polymeric microparticle composition comprising an interpenetrating polymer network wherein the interpenetrating polymer network comprises one or more labile polymers and wherein the expandable polymeric microparticles have an unexpanded volume average particle size diameter of from about 0.05 to about 5,000 microns.

2. The composition of claim 1 wherein the labile polymers comprise crosslinked expandable polymeric microparticles.

3. The composition of claim 2 wherein the labile polymers have a cross linking agent content of from about 1000 to about 200,000 ppm of labile cross linkers and from 0 to about 300 ppm of non-labile cross linkers.

4. The composition of claim 3 wherein the labile polymer comprises about 1 to about 25 weight percent of the total polymer content of the microparticles.

5. The composition of claim 3 wherein the labile cross linkers are selected from diacrylates and polyfunctional derivatives of a polyalcohol.

6. The composition of claim 1 wherein the labile polymer comprises one or more ionic cross-linkers.

7. The composition of claim 6 wherein ionic cross-linkers comprise cationic ester monomers.

8. The composition of claim 1 wherein the labile polymers comprise about 1 to about 75 weight percent of the total polymer content of the microparticles.

9. The composition of claim 1 wherein the expandable polymeric microparticles comprise cross-linked latex polymers.

10. A method of modifying the permeability to water of a subterranean formation, comprising injecting into the subterranean formation an expandable polymeric microparticle composition comprising an interpenetrating polymer network wherein the expandable polymeric microparticles have an unexpanded volume average particle size diameter of from about 0.05 to about 5,000 microns and wherein the expandable polymeric microparticles have a smaller diameter than the pores of the subterranean formation and wherein the expandable polymeric microparticles expand under a change in environmental conditions in the subterranean formation.

11. The method of claim 10 wherein the composition is added to injection water as part of a secondary or tertiary process for the recovery of hydrocarbon from the subterranean formation.

12. The method of claim 11 wherein the injection water is added to the subterranean formation at a temperature lower than the temperature of the subterranean formation.

13. The method of claim 10 wherein the change in the environmental conditions results from introducing an activation agent into the formation.

14. The method of claim 13 wherein the activation agent comprises a reducing agent, an oxidation agent, an acid, a base or a biological agent.

15. The method of claim 10 wherein the interpenetrating polymer network further comprises one or more labile polymers.

16. The method of claim 10 wherein said change in the environmental conditions comprises a change in temperature, a change in pressure, a change in pH a change in salinity, a change in shear force or a change in dilution.

17. The method of claim 10, wherein the composition is added to injection water as part of a secondary or tertiary process for the recovery of hydrocarbon fluids from the subterranean formation.

18. The method of claim 10, wherein the composition is injected into the subterranean formation as part of a carbon dioxide and water tertiary recovery project.

19. The method of claim 10, wherein the composition is injected into the subterranean formation as part of a tertiary oil recovery process, one component of which constitutes water injection.

20. The method of claim 10, wherein the subterranean formation is a sandstone or carbonate hydrocarbon reservoir.

* * * * *